United States Patent [19]

Banin et al.

[11] Patent Number: 6,093,669

[45] Date of Patent: *Jul. 25, 2000

[54] METHOD FOR SELECTING RAW MATERIAL FOR BLEACHING CLAY

[75] Inventors: Amos Banin, Rehovot, Israel; Dov Shaked, Buffalo Grove, Ill.; Marc A. Herpfer, Naperville, Ill.; William F. Moll, Crystal Lake, Ill.

[73] Assignee: Oil-Dri Corporation of America, Chicago, Ill.

[ * ] Notice: This patent is subject to a terminal disclaimer.

[21] Appl. No.: 09/119,662

[22] Filed: Jul. 21, 1998

Related U.S. Application Data

[63] Continuation-in-part of application No. 08/564,853, Nov. 30, 1995, Pat. No. 5,783,511.

[51] Int. Cl.$^7$ .............................. B01J 21/16; B01J 20/12; C04B 33/04
[52] U.S. Cl. ......................... 501/146; 106/486; 106/488; 502/81; 502/83; 423/118.1; 423/328.1
[58] Field of Search .................................... 106/484, 486, 106/488, 287.17; 501/146; 502/72, 81, 83, 408; 423/118.1, 328.1

[56] References Cited

U.S. PATENT DOCUMENTS 1,781,265  11/1930  Baylis .
2,018,987  10/1935  Wirzmuller .
2,477,386   7/1949  McCarter .
2,671,058   3/1954  Mickelson .
3,617,215  11/1971  Sugahi et al. .
4,717,699   1/1988  Mickelson .
5,008,226   4/1991  Taylor et al. .
5,330,946   7/1994  Hynes et al. .
5,468,701  11/1995  Nebergall et al. .
5,783,511   7/1998  Banin et al. ............................ 106/486

OTHER PUBLICATIONS

Banin, A., et al., "Particle Size and Surface Properties of Acidic Montmorillonite," in *Proceedings of the International Clay Conference*, vol. 1, pp. 669–682, Tokyo, Japan (1969) (no month).

Guggenheim et al., Clays and Clay Minerals 43(2):255–256 (1995) (no month).

*Primary Examiner*—Michael Marcheschi
*Attorney, Agent, or Firm*—Olson & Hierl, Ltd.

[57] ABSTRACT

A process for making a bleaching clay composition useful for purification of oil is disclosed. The process involves controlled acidification of a palygorskite and smectite clay mineral with sulfuric acid. The clay mineral starting material exhibits, in an aqueous slurry, an electrical conductivity of at least about 50 microSiemens per centimeter.

5 Claims, 3 Drawing Sheets

METHOD FOR SELECTING RAW MATERIAL FOR BLEACHING CLAY

CROSS-REFERENCE TO RELATED APPLICATION

This application is a continuation-in-part of U.S. Ser. No. 08/564,853 filed on Nov. 30, 1995 and now U.S. Pat. No. 5,783,511.

TECHNICAL FIELD

This invention relates to clay-based compositions suitable for the bleaching of oil. In particular, the present invention is directed to a method of selecting appropriate raw materials for treatment, as well as the treatment of those raw materials to produce clay compositions suitable for the adsorptive purification, such as bleaching, of oils.

BACKGROUND OF THE INVENTION

Fats and fatty oils, commonly called triglycerides, are constituted of triesters of glycerol, and include minor amounts of fatty acids. At ambient temperatures, about 20 degrees Celsius to about 25 degrees Celsius, fats are solids, whereas fatty oils are liquids.

Triglycerides are widely distributed in nature. Some triglycerides are edible while others are not. Many are derived directly from vegetable, animal, and marine sources. Others are obtained, as by-products, in the production of fiber from vegetable matter, and in the production of protein from vegetable, animal or marine matter.

Edible vegetable oils include canola, coconut, corn germ, cottonseed, olive, palm, peanut, rapeseed, safflower, sesame seed, soybean, and sunflower oils. Examples of nonedible vegetable oils are jojoba oil, linseed oil and castor oil.

Illustrative sources of edible animal-derived oil include lard and tallow. Examples of nonedible animal-derived oil are low grade tallow and neat's-foot oils.

Some of these oils may have a color that is objectionable to a consumer. Thus, the oil needs to be bleached to improve its color quality. To this end, a great many oils are commonly treated with bleaching clays to reduce oil color values by adsorptive purification. Bleaching clays generally improve oil color quality by selectively adsorbing color impurities that are present. Color impurities typically present in oils include, for example, carotenoids, xanthophylls, xanthophyll esters, chlorophyll, tocopherols, as well as oxidized fatty acids and fatty acid polymers.

It is also desirable to remove color impurities from a nonedible oil to obtain an acceptable color.

Natural clays, e.g., Fuller's earth and the bentonites, have commonly been used as bleaching clays to remove both the naturally-occurring and the otherwise-present, e.g., the thermally-induced, color impurities from edible and nonedible oils. It has been suggested that clays containing a zeolite can be used for such a purpose as well.

Acid-activated clays have also been used for this purpose. Such clays generally remove a relatively wider spectrum of color impurities. However, there has been no way of predicting which clays have properties that make them preferable for acid activation methods.

A conventional process for producing acid-activated bleaching clays utilizes calcium bentonite clays and sulfuric acid. The calcium bentonites used in the acid activation process typically are neutral to mildly basic. The acidic salts formed during activation and residual acid can be washed off and separated by filtration from the product clay, if desired. However, it is not necessary to do so.

Other suitable naturally-occurring clays are the palygorskite clays. Mineralogically, the palygorskite (attapulgite) clays are distinguishable from the bentonites (smectites, including montmorillonites).

What is needed is a way to identify clay minerals that are readily susceptible to treatment with acid to produce a useful bleaching clay product suitable for adsorptive purification of an oil. Furthermore, what is needed is a method of manufacturing a bleaching clay product that has enhanced surface acidity and that provides product efficacy for purification, e.g., bleaching, of an oil.

SUMMARY OF THE INVENTION

A method for making a bleaching clay product from a non-acidic palygorskite—smectite type clay mineral by controlled acidification with sulfuric acid is provided. The present method provides optimal acid activation of the clay mineral without substantial deterioration of the clay mineral structure.

The present method comprises the step of combining a palygorskite and smectite clay mineral with sulfuric acid while maintaining a substantially constant ratio of surface acidity to added acidity for the clay mineral. A preferred starting material is a palygorskite—smectite clay mineral having a basic pH value in aqueous suspension. Preferably, the clay mineral exhibits on electrical conductivity of at least about 50 microSiemens per centimeter ($\mu$S/cm) in an aqueous slurry at 25 degrees Celsius. Sulfuric acid is added to the clay mineral in an amount such that the produced bleaching clay product has no more than about 1.5 milliequivalents of acidity per gram.

Acidification of the clay mineral is preferably monitored by measuring the electrical conductivity of an aqueous slurry of the clay mineral to which an acid such as sulfuric acid has been added.

DESCRIPTION OF THE EMBODIMENTS

Figure 1:
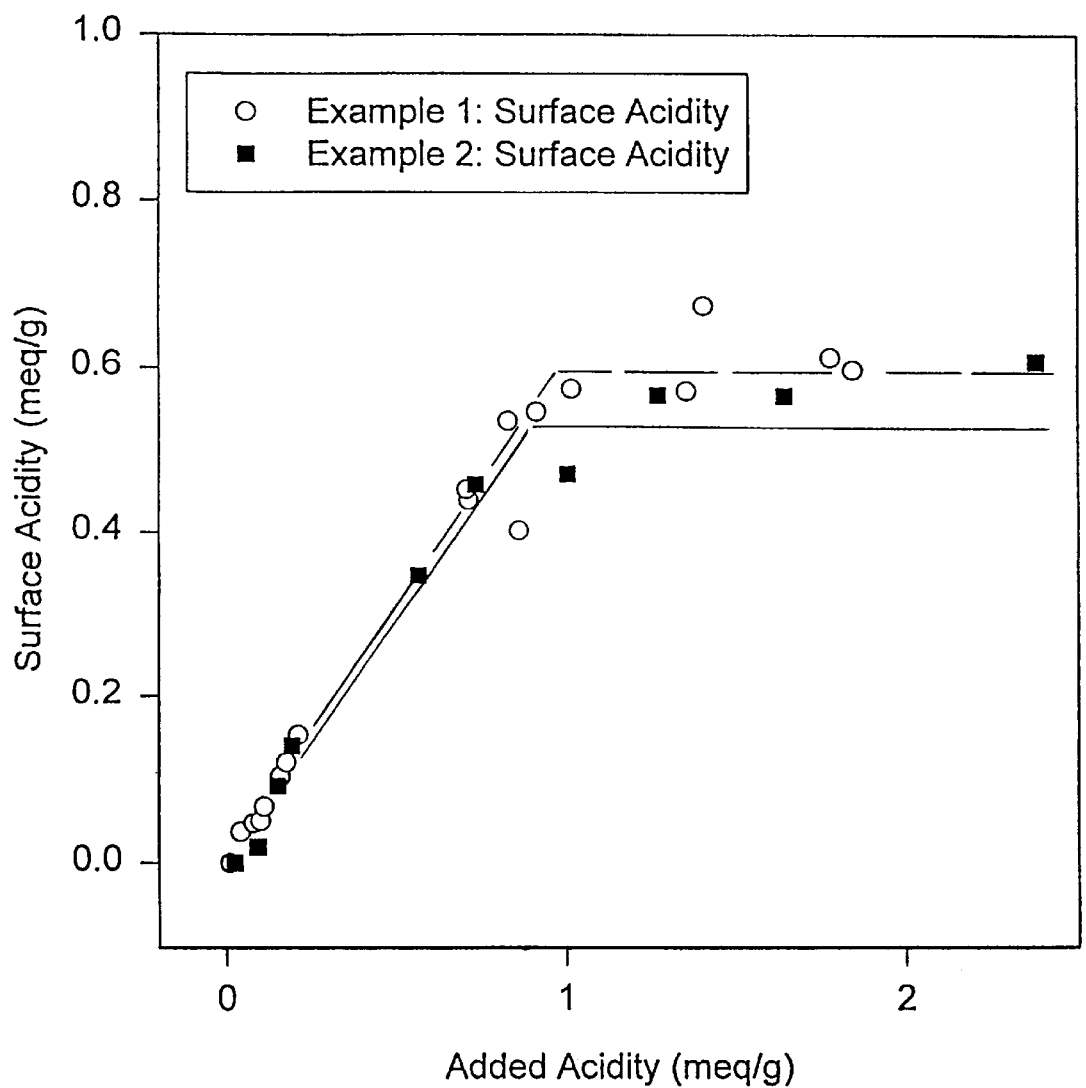
FIG. 1 is a graphical representation of the data of Examples 1 and 2, showing the relationship between added acidity and surface acidity of a slurry of palygorskite—smectite clay mineral from sources A (open circles) and B (filled squares)

While this invention is susceptible to embodiments in many different forms, preferred embodiments of the invention are described below. It should be understood, however, that the present disclosure is to be considered as a exemplification of the principles of the invention and is not intended to limit the invention to the specific embodiments illustrated.

Throughout this application, the term "oil," and the grammatical variations thereof, includes vegetable-derived, animal-derived as well as marine source-derived fats and fatty oils that are liquids at the particular temperature that is necessary for desired processing of a particular type of oil.

In use, the oil and the present oil bleaching composition are combined in a suitable vessel to produce a slurry. The resulting slurry is maintained at an elevated temperature and at a pressure no greater than about atmospheric pressure, preferably less than atmospheric, for a time period sufficient to reduce the amount of color impurities of the oil without causing degradation of the oil, i.e., the oil is bleached substantially without thermal decomposition of the oil. A bleached oil is then recovered from the slurry.

The bleaching is performed at a temperature elevated above room temperature, i.e., at about 30 degrees Celsius and higher, but below the temperature that induces thermal decomposition of the oil. A preferred bleaching temperature is in a range of about 50 degrees to about 130 degrees Celsius, more preferably about 60 degrees Celsius to about 125 degrees Celsius.

The pressure at which the bleaching is performed can be atmospheric or less than atmospheric (subatmospheric), as desired. A suitable reduced pressure is in a range of about 1 to about 26 inches of mercury (3.4 kPa to about 88 kPa). A preferred reduced pressure is in a range of about 1 to about 5 inches of mercury (3.4 kPa to about 16.9 kPa). A most preferred reduced pressure is about 4 inches of mercury (13.5 kPa).

The contact time period sufficient to reduce the amount of color impurities in the oil utilizing the present bleaching compositions usually is in a range of about 5 to about 90 minutes.

Oils that can be bleached using the composition of the present invention include both edible and inedible oils. Illustrative oils are those previously mentioned hereinabove.

The term "clay" refers to a naturally occurring material composed primarily of fine-grained minerals, which is generally plastic at appropriate water contents and will harden when dried or fired. Although clay usually contains phyllosilicates, it also may contain other materials that impart plasticity and harden when dried or fired. Associated phases in clay may include materials that do not impart plasticity and organic matter.

The term "clay mineral" refers to phyllosilicate minerals and to minerals which impart plasticity and which harden upon drying or firing. See generally, Guggenheim, S. & Martin, R. T., "Definition of Clay and Clay Mineral: Joint Report of the AIPEA Nomenclature and CMS Nomenclature Committees," *Clays and Clay Minerals* 43: 255–256 (1995).

Materials suitable for the activating treatment of the present invention are clay minerals, preferably having a free moisture content of no more than about 50 weight percent, and preferably having a basic pH value in aqueous suspension.

These clay minerals are characterized by a mineral structure formed by the arrangement of octahedral units and tetrahedral units or by stacked layers formed by an octahedral sheet and one or more tetrahedral sheets of the atoms that constitute the clay mineral structure. Illustrative are the two groups of naturally occurring clay minerals. First is the hormite group, defined here as including palygorskite and sepiolite, which have channels formed by octahedral units and tetrahedral units of the clay mineral structure. Second is the smectite group including montmorillonites and saponite, which are constituted by stacked layers formed by an octahedral sheet and more than one tetrahedral sheet, and mixtures of the foregoing.

Palygorskite (attapulgite), a mineral found in some clay deposits, is a hydrous silicate mineral represented by the ideal formula:

$(OH_2)_4(OH)_2Mg_5Si_8O_{20} \cdot 4H_2O$.

See, e.g., Grim, R. E., *Clay Mineralogy*, 2nd ed., McGraw-Hill, Inc., New York, N.Y. (1968), p. 115. Other members of the hormite group of minerals, such as sepiolite, can be associated with palygorskite.

Smectite is a generic term that refers to a variety of related minerals also found in some clay deposits. The smectite minerals typically occur only as extremely small particles. Smectite is composed of units made of two silica tetrahedral sheets with a central alumina octahedral sheet. Each of the tetrahedra has a tip that points to the center of the smectite unit. The tetrahedral and octahedral sheets are combined so that the tips of the tetrahedra of each silica sheet and one of the hydroxyl layers of the octahedral sheet form a common layer. See Id., pp. 77–78. Smectite minerals exhibit intracrystalline swelling.

In particular, the smectite family of clay minerals includes the various mineral species montmorillonite, beidellite, nontronite, hectorite and saponite, all of which can be present in the clay mineral in varying amounts.

Other minerals, neither of the smectite genus nor of the hormite variety, that can be present in minor amounts in the clay earth materials suitable for the present purpose include opal, apatite, calcite, the feldspars, amorphous silica (diatoms), kaolinite, mica, quartz, pyrite and gypsum, among others.

The analysis of the relationship between added acidity and acidity found in solution has been found to be useful to minimize the likelihood of over—acidification and attendant deterioration of the clay mineral structure. Thus, the present invention relates to the process of optimizing the acidification treatment for producing bleaching clay products.

Optimized acidification of a palygorskite—smectite clay mineral is depicted graphically in FIG. 1 where the ordinate is surface acidity (SA) for a clay mineral, expressed as milliequivalents of acidity per gram and the abscissa is the amount of added acidity (A), also expressed as milliequivalents of acidity per gram.

Acidification of the palygorskite—smectite clay mineral is effected by adding sulfuric acid to the clay mineral in an amount not to exceed about 1.5 milliequivalents of acidity per gram of produced bleaching clay product. Preferably the amount of sulfuric acid added is about 0.5 to about 1.5 milliequivalents of acidity per gram of bleaching clay product (measured on a dry basis), more preferably about 0.75 to about 1.25 milliequivalents of acidity per gram of bleaching clay product. Sulfuric acid may be added as an aqueous solution or as concentrated sulfuric acid. The term "sulfuric acid" refers herein to either an aqueous solution of sulfuric acid or concentrated sulfuric acid.

The addition of sulfuric acid to the palygorskite—smectite clay mineral can be achieved in any convenient manner. For example, sulfuric acid may be added by spraying sulfuric acid onto an agitated particulate clay mineral bed, by adding aqueous sulfuric acid to a particulate clay mineral as it is passed through a pug mill, and the like.

The resulting bleaching clay product is not washed with water, but instead is dried and comminuted to a desired particle size.

The addition of sulfuric acid is effected so as to maintain a substantially constant ratio of surface acidity to added acidity for the produced bleaching clay product. Surface acidity is calculated as the difference between total acidity (acidity of a clay suspension) and solution acidity (acidity of a water extract of the clay suspension).

The addition of sulfuric acid so as to maintain a substantially constant ratio of surface acidity to added acidity is illustrated in FIG. 1, where the slope of the depicted curve is substantially constant until the added acidity exceeds about 1 milliequivalent per gram of bleaching clay product. Further addition of sulfuric acid does not result in an increase of surface acidity, the desired acidity for bleaching, but instead increases the likelihood of structural deterioration of the clay mineral structure.

The selection of the clay mineral starting material and its acidification can be readily monitored by observing the pH value of a slurried aliquot of the clay mineral or the electrical conductivity thereof.

With respect to the latter, it has been found that the bleaching performance of a non-acidic clay mineral comprising palygorskite and smectite can be optimized by selecting for acidification such a clay mineral that exhibits an electrical conductivity (EC) value in an aqueous slurry (about 3.6 wt-% solids) at 25 degrees Celsius. of at least about 50 microSiemens per centimeter ($\mu$S/cm), more preferably at least about 70 $\mu$S/cm. Preferably the electrical conductivity value of the starting clay mineral does not exceed about 350 $\mu$S/cm; i.e., the preferred range of electrical conductivity values for the clay mineral prior to acidification is about 50 to about 350 $\mu$S/cm. Commercially available electrical conductivity meters can be utilized for the foregoing measurements.

For bleaching an oil, the amount of the present bleaching clay that is combined with the oil to be bleached usually is in the range of about 1 to about 5 weight percent, based on the weight of the oil. Lesser or greater amounts can be used, depending upon the oil to be treated and the severity of the desired bleaching treatment.

The present invention is illustrated by the following examples.

EXAMPLE 1

Treatment of Clay

Raw palygorskite—smectite clay mineral mixture was obtained from Source A. Each raw clay sample was ground to less than 3 mm in largest dimension by a laboratory hammer mill. The clay mineral mixture exhibited an electrical conductivity of about 78 microSiemens per centimeter in an aqueous slurry at 25 degrees Celsius and about 3.6 weight percent solids.

Acidity was added in the form of sulfuric acid ($H_2SO_4$) in the amount of about 0.25 to about 10 weight percent based on the dry weight of the clay mineral. Added acidity, total acidity and solution acidity were noted, and were expressed as milliequivalents of acidity per gram of bleaching clay product. The pH of a 1% slurry of the clay mineral in water was measured. Acidity found on the surface (surface acidity) was calculated as total acidity in suspension less solution acidity. Slight differences in the values for surface acidity found in Tables 1 and 2 are due to rounding.

After the acid treatment was applied to the samples, they were dried to about 10 weight percent free moisture and ground to 90–92% to −200 mesh and 69–71% to −325 mesh (U.S. Sieve Series). These finely ground samples were used for the various analyses and experiments reported below.

A sample of 0.200±0.005 g air dried bleaching clay product was suspended to 20 ml distilled water to form a 1% suspension and equilibrated for 20 minutes before the measurement of suspension pH. A 20 ml sample of the water extract from a 1% clay suspension was used for the measurement of solution pH. The suspension and the solution aliquots were placed in a temperature controlled water bath maintained at 25±0.1 degrees Celsius and titrated with calibrated 0.01N NaOH and 0.1N NaOH solutions using a Dosimat titrator. The base addition rate was in the range of 0.1–0.6 ml/min and 0.01–0.2 ml/min for the 0.01N and 0.1N NaOH solutions, respectively. The rate was selected depending on the sample acidity, and was kept constant throughout each titration. The 0.1N NaOH solution was used for $H_2SO_4$ added at 7.5 and 10 weight percent. When using the slowest rate to titrate high-acidity clay, the titration took about 10 hours, compared to the usual duration of 15–25 minutes. At least two replicate titrations were conducted for each clay. The experimental error was generally less than 5% for titration volumes larger than 0.3 ml base.

A combined (glass+calomel) pH electrode and a pH meter were used for pH measurements. Titration curves were recorded using a computerized system. The system was calibrated using standard buffers at pH 4.0 and pH 7.0. The milliequivalents NaOH added were converted to milliequivalents acidity per gram of dry clay.

The specific surface area was measured by the ethylene glycol monoethyl ether (EGME) method. See generally, Bradley, et al., *Clays and Clay Minerals* 10: 117–122 (1961); Brindley, G. W. and Hoffmann, R. W., *Clays and Clay Minerals* 9: 546–556 (1960); Carter, et al., *Soil Sci.* 100: 356–360 (1965); Ratner-Zohar, et al., *Soil Science Society of America Journal* 47: 1056–1057 (1983).

Each sample was tested for bleaching activity with canola oil. Canola oil (100 g) containing chlorophyll (26,000 ppb) was combined with 1.5 weight percent of clay and bleached at 108 degrees Celsius for 30 minutes under partial vacuum of 26 inches of mercury (88 kPa; 0.87 atmosphere). The remaining chlorophyll values in the bleached oils were measured as absorption of chlorophyll pigments determined with a Beckman spectrophotometer.

Figure 2:
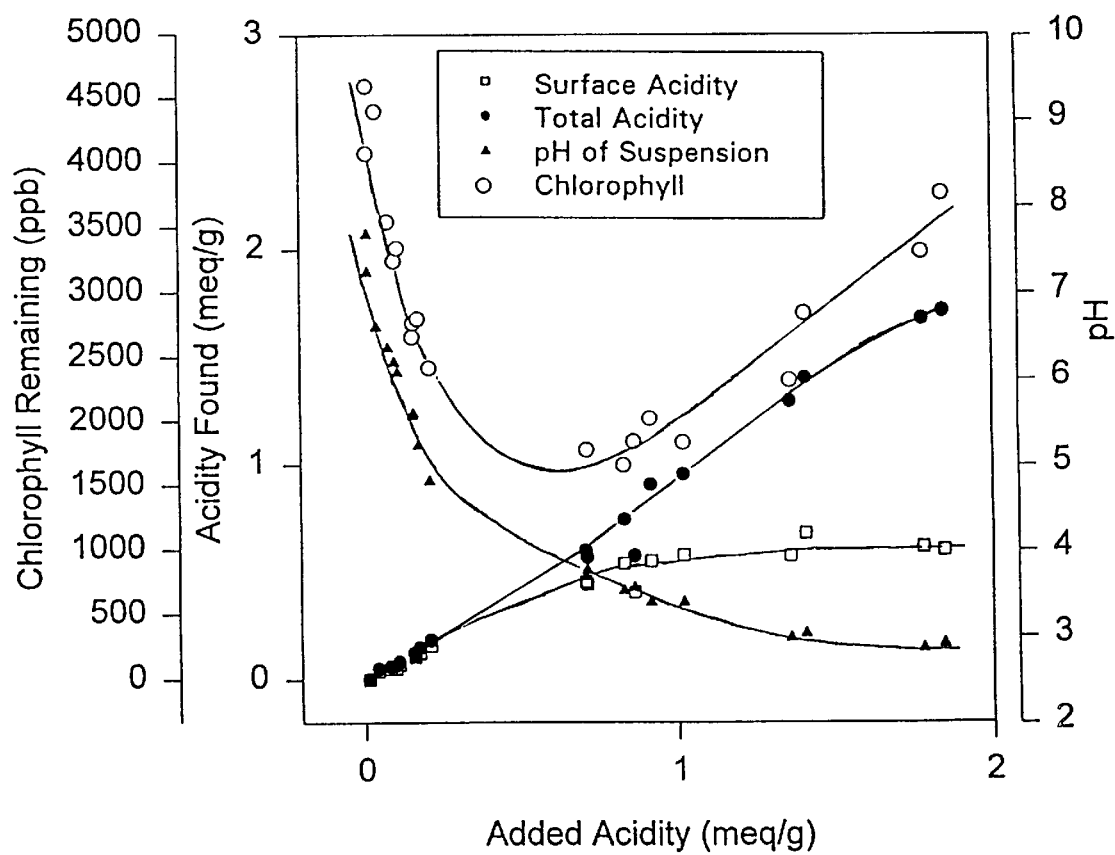
FIG. 2 is a graphical representation of the data from Example 1 showing the relationships of added acidity to surface acidity (open squares), total acidity (filled circles), pH of the suspension (filled triangles) and the chlorophyll remaining in bleached oil after treatment (open circles), respectively.

The results are shown in Table 1 and FIGS. 1 and 2. In FIG. 1, the open circles indicate the acid found (surface acidity) compared to the acid added, expressed as milliequivalents of sulfur per gram of clay. The acid found was noted to rise as acidity added increased.

The amount of chlorophyll remaining reached a minimum at about 0.7 to about 0.8 milliequivalents of acidity per gram of clay product of added acidity (Table 1). This range corresponded to about 3.5 to about 4.5 weight percent of added sulfuric acid, based on weight of clay.

FIG. 2 compares the relationships of added acidity to surface acidity (open squares), total acidity (filled circles), initial pH of the suspension (filled triangles) and the chlorophyll remaining in bleached oil (open circles). The amount of chlorophyll remaining was optimally reduced in the range of about 0.5 to about 1.5 milliequivalents per gram acidity added. More preferably acidity is added in the range from about 0.75 to 1.25 milliequivalents per gram.

The results of Table 1 also show a decrease in specific surface area due to an attack by excess acid on the crystal structure of the clay minerals.

TABLE 1

| H$_2$SO$_4$ Added wt % dry basis | Added Acidity (meq/g) | Moisture Content, wt % | Specific Surface Area (m$^2$/g EGME) | Initial pH, Suspension[1] | Initial pH, Solution[1] | Total Acidity (meq/g) | Solution Acidity (meq/g) | Surface Acidity (meq/g) | Remaining Chlorophyll[2] ppb |
|---|---|---|---|---|---|---|---|---|---|
| 0 | 0.013 | 12.44 | 512 | 7.67 | 8.77 | 0 | 0 | 0 | 4075 |
| 0 | 0.014 | 9.42 | 495 | 7.23 | 7.22 | 0 | 0 | 0 | 4596 |
| 0.25 | 0.043 | 10.65 | 496 | 6.6 | 6.65 | 0.048 | 0.011 | 0.037 | 4400 |
| 0.25 | 0.08 | 10.3 | 496 | 6.36 | 6.36 | 0.058 | 0.011 | 0.047 | 3546 |
| 0.5 | 0.1 | 12.49 | 476 | 6.19 | 6.48 | 0.064 | 0.014 | 0.050 | 3245 |
| 0.5 | 0.11 | 11.39 | 494 | 6.07 | 6.398 | 0.078 | 0.011 | 0.067 | 3344 |
| 0.75 | 0.16 | 8.3 | 461 | 5.59 | 6.78 | 0.112 | 0.011 | 0.102 | 2768 |
| 0.75 | 0.157 | 8.72 | 472 | 5.56 | 6.7 | 0.119 | 0.016 | 0.103 | 2660 |
| 1 | 0.175 | 17.82 | 491 | 5.22 | 6.02 | 0.143 | 0.024 | 0.120 | 2800 |
| 1 | 0.21 | 11.22 | 477 | 4.8 | 6.09 | 0.177 | 0.024 | 0.153 | 2420 |
| 3.5 | 0.711 | 12.21 | 465 | 3.76 | 3.92 | 0.563 | 0.124 | 0.439 | 1782 |
| 3.5 | 0.706 | 10.42 | 462 | 3.68 | 3.78 | 0.594 | 0.142 | 0.452 | |
| 4.5 | 0.829 | 11.21 | 429 | 3.52 | 3.79 | 0.739 | 0.204 | 0.535 | 1663 |
| 4.5 | 0.862 | 11.49 | 451 | 3.55 | 3.95 | 0.569 | 0.167 | 0.402 | 1845 |
| 5.5 | 0.914 | 12.09 | 424 | 3.38 | 3.47 | 0.904 | 0.358 | 0.546 | 2022 |
| 5.5 | 1.018 | 11.54 | 463 | 3.38 | 3.41 | 0.954 | 0.379 | 0.574 | 1839 |
| 7.5 | 1.36 | 10.42 | 391 | 2.97 | 3.08 | 1.295 | 0.724 | 0.571 | 2323 |
| 7.5 | 1.409 | 11.04 | 360 | 3.02 | 3.06 | 1.404 | 0.729 | 0.675 | 2840 |
| 10 | 1.781 | 11.5 | 322 | 2.85 | 2.92 | 1.678 | 1.067 | 0.612 | 3312 |
| 10 | 1.847 | 11.02 | 288 | 2.90 | 2.89 | 1.714 | 1.117 | 0.597 | 3759 |

[1]weight percent slurry
[2]Starting conditions: 26000 ppb chlorophyll, 1.5 weight percent clay

EXAMPLE 2

Clay Source B

Raw palygorskite—smectite clay material from Source B was prepared as described in Example 1. The clay mineral mixture exhibited an electrical conductivity of about 18 microSiemens per centimeter in an aqueous slurry at 250C. And about 3.6 weight percent solids.

Added acidity, acidity found on the surface and the total acidity were noted and expressed as milliequivalents of sulfur per gram of clay. The pH of a 1% slurry of clay in water was measured. Each sample was tested for bleaching activity with canola oil as described in Example 1. The results are presented in FIGS. 1 and 3, as well as in Table 2.

Figure 3:
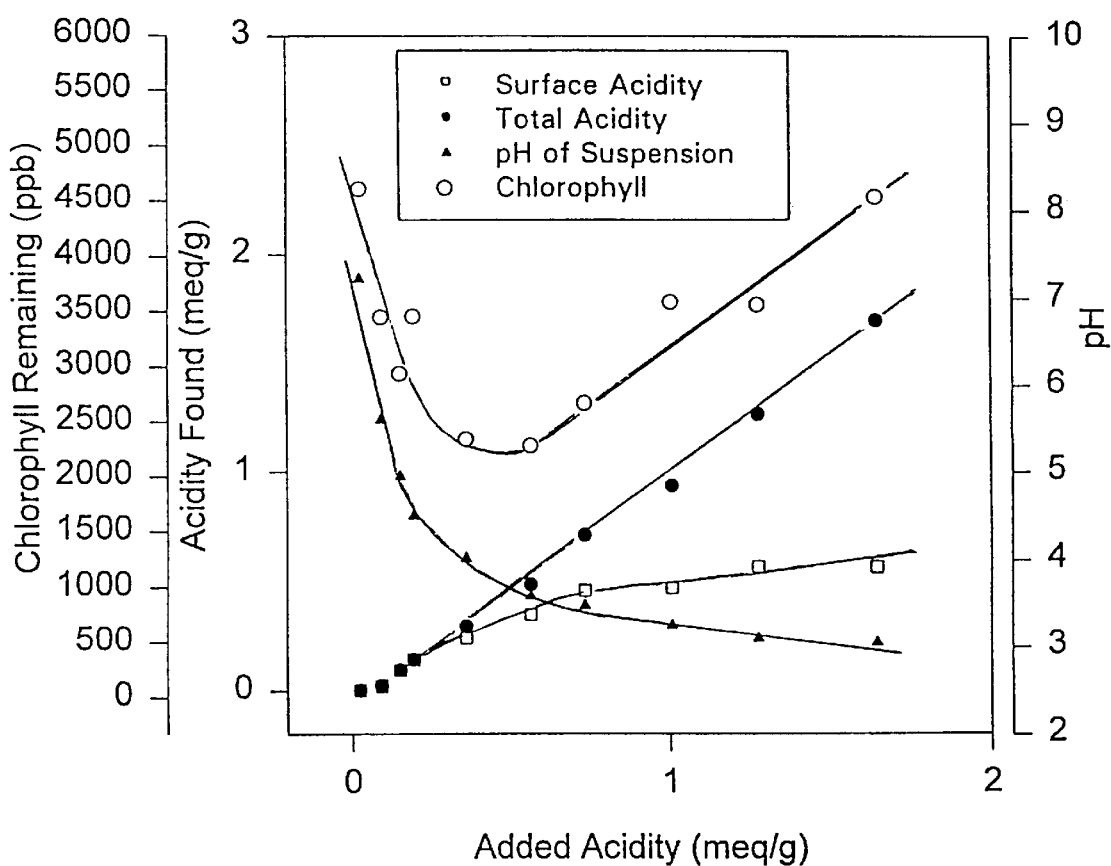
FIG. 3 is a graphical representation of the data from Example 2 showing the relationships of added acidity to surface acidity (open squares), total acidity (filled circles), pH of the suspension (filled triangles) and the chlorophyll remaining in bleached oil after treatment (open circles), respectively.

In FIG. 1, the filled squares indicate the acid found (surface acidity) compared to the acid added, expressed as milliequivalents of sulfur per gram of clay. The acid found was noted to increase as acidity added increased. FIG. 3 compares the relationships of added acidity to surface acidity (open squares), total acidity (filled circles), initial pH of the suspension (filled triangles) and the chlorophyll remaining in bleached oil (open circles). As found in Example 1, the amount of chlorophyll remaining is reduced in the range of about 0.5 to about 1.5 milliequivalents per gram acidity added. The amount of chlorophyll remaining reached a minimum at about 0.6 milliequivalents of added acidity per gram of clay product of added acidity (see Table 2). This range corresponded to from about 0.75 to about 7.5 weight percent of added sulfuric acid, expressed as percent of weight of clay.

TABLE 2

| H$_2$SO$_4$ Added wt % dry basis | Added Acidity (meq/g) | Specific Surface Area (m$^2$/g EGME) | Initial pH, Suspension[1] | Total Acidity (meq/g) | Solution Acidity (meq/g) | Surface Acidity (meq/g) | Remaining Chlorophyll[2] ppb |
|---|---|---|---|---|---|---|---|
| 0 | 0.025 | 556 | 7.22 | 0 | 0 | 0.000 | 4611 |
| 0.5 | 0.092 | 556 | 5.60 | 0.020 | 0.001 | 0.019 | 3455 |
| 0.75 | 0.150 | 650 | 4.95 | 0.092 | 0.000 | 0.092 | 2938 |
| 1 | 0.192 | 638 | 4.49 | 0.140 | 0.000 | 0.140 | 3462 |
| 2 | 0.357 | 620 | 4.01 | 0.293 | 0.053 | 0.240 | 2340 |
| 3 | 0.562 | 500 | 3.58 | 0.486 | 0.139 | 0.347 | 2281 |
| 4 | 0.733 | 581 | 3.47 | 0.709 | 0.250 | 0.458 | 2667 |
| 5 | 1.006 | 496 | 3.24 | 0.936 | 0.464 | 0.471 | 3590 |
| 7.5 | 1.276 | 365 | 3.09 | 1.266 | 0.700 | 0.566 | 3563 |
| 10 | 1.646 | 286 | 3.04 | 1.696 | 1.132 | 0.565 | 4534 |
| 15 | 2.380 | 176 | 2.89 | 2.488 | 1.881 | 0.607 | 6977 |

[1]1 weight percent slurry
[2]Starting conditions: 26000 ppb chlorophyll, 1.5 weight percent clay Table 2 also indicates that excessive addition of sulfuric acid has an adverse effect on chlorophyll removal.

EXAMPLE 3

Electrical Conductivity and pH Values of Acidified Bleaching Clays

Raw palygorskite-smekite clay minerals (clay sources C-E) were acidified by the addition of sulfuric acid to the clay mineral. The amount of sulfuric acid present on the clay was determined using LECO SC 432 sulfur analyzer. The sulfuric acid treated clay minerals were then evaluated for bleaching performance using refined soybean oil (RSBO) before and after deodorization. The red and yellow color values for bleached oil (RB RED and RB YELLOW, respectively) and bleached and deodorized oil (RBD RED and RBD YELLOW, respectively) were noted. The pH and the electrical conductivity values for the treated clay minerals were noted as well. The observed results are presented in Table 3, below.

The data in Table 3 indicate that the acidification process can be readily monitored by noting the electrical conductivity or pH value of this clay mineral being acidified. Moreover, the observed electrical conductivity values can serve to indicate when an optimized level of acidification has been reached as indicated by a subsequent relatively rapid rise in the electrical conductivity value for the acidified clay mineral aliquot.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. In a method for the manufacture of a bleaching clay product by combining a non-acidic clay mineral comprising palygorskite and smectite with sulfuric acid the improvement which comprises contacting the clay mineral with

TABLE 3

ELECTRICAL CONDUCTIVITY OF CLAY MINERAL DURING ACIDIFICATION

| | CLAY SOURCE C | | | | | | CLAY SOURCE D | | | | | |
|---|---|---|---|---|---|---|---|---|---|---|---|---|
| % ACID/LECO[1] | 0 | 1.1 | 1.45 | 1.7 | 1.54 | 3.06 | 0 | 1.59 | 1.64 | 1.24 | 2.16 | 3.08 |
| ID# | 1 | 2 | 3 | 4 | 5 | 6 | 7 | 8 | 9 | 10 | 11 | 12 |
| CHL | 119 | 63 | 63 | 58 | 61 | 31 | 100 | 54 | 55 | 47 | 41 | 38 |
| CHL | 116 | 69 | 61 | 56 | 60 | 45 | 93 | 52 | 49 | 50 | 39 | 41 |
| CHL[2] (Ave) | 117.5 | 66 | 62 | 56 | 60.5 | 38 | 96.5 | 63 | 52 | 48.5 | 40 | 39.5 |
| RB Red | 4.9 | 4.7 | 4.3 | 4.6 | 3.9 | 4.8 | 5.9 | 5.9 | 5.8 | 5.7 | 5.9 | 6.2 |
| RB Red | 4.9 | 4.1 | 3.7 | 4.4 | 3.9 | 4.2 | 5.3 | 5.2 | 5.2 | 5.5 | 5.6 | 6.0 |
| RB Red (Ave) | 4.9 | 4.4 | 4.0 | 4.5 | 3.9 | 4.6 | 5.6 | 5.55 | 5.5 | 5.6 | 5.75 | 6.1 |
| RB Yellow | 70 | 70 | 70 | 70 | 70 | 70 | 70 | 70 | 70 | 70 | 70 | 70 |
| RBD Red | 0.4 | 0.3 | 0.5 | 0.3 | 0.6 | 0.4 | 0.2 | 0.5 | 0.5 | 0.4 | 0.5 | 0.5 |
| RBD Red | 0.4 | 0.6 | 0.6 | 0.7 | 0.6 | 0.5 | 0.2 | 0.6 | 0.4 | 0.4 | 0.6 | 0.6 |
| RBD Red (Ave) | 0.4 | 0.45 | 0.55 | 0.5 | 0.6 | 0.45 | 0.2 | 0.55 | 0.45 | 0.4 | 0.55 | 0.55 |
| RBD Yellow | 3.7 | 3.0 | 3.5 | 3.6 | 3.5 | 3.3 | 3.6 | 3.7 | 3.6 | 3.3 | 3.8 | 3.2 |
| RBD Yellow | 3.6 | 3.6 | 3.7 | 3.8 | 3.4 | 3.9 | 3.0 | 3.7 | 3.1 | 3.5 | 4.1 | 3.4 |
| RBD Yellow (Ave) | 3.66 | 3.3 | 3.6 | 3.65 | 3.35 | 3.6 | 3.3 | 3.7 | 3.3 | 3.4 | 3.95 | 3.3 |
| RBD Color Index | 0.380 | 0.39 | 0.455 | 0.433 | 0.468 | 0.405 | 0.265 | 0.46 | 0.39 | 0.37 | 0.473 | 0.44 |
| FM[3], wt-% | 8.6 | 8.2 | 8.0 | 7.6 | 9.6 | 9.8 | 9.0 | 8.0 | 8.4 | 8.2 | 6.8 | 9.2 |
| pH (5% slurry) | 7.30 | 3.99 | 3.85 | 3.75 | 3.69 | 3.09 | 6.80 | 3.38 | 3.42 | 3.71 | 3.27 | 3.04 |
| EC[4] $\mu$S/cm | 70.8 | 1049.0 | 1330.0 | 1500.0 | 1415.0 | 2510.0 | 33.6. | 1616.0 | 1640.0 | 1248.0 | 2210.0 | 2820.0 |

| | CLAY SOURCE E | | | | |
|---|---|---|---|---|---|
| % ACID/LECO[1] | 0 | 1.19 | 1.59 | 1.56 | 1.45 |
| ID# | 13 | 14 | 15 | 16 | 17 |
| CHL | 115 | 80 | 78 | 72 | 69 |
| CHL | 110 | 73 | 85 | 63 | 70 |
| CHL[2] (Ave) | 112.5 | 76.5 | 71.5 | 67.5 | 89.5 |
| RB Red | 7.5 | 7.7 | 7.9 | 7.5 | 7.5 |
| RB Red | 6.7 | 7.3 | 7.1 | 7.4 | 7.3 |
| RB Red (Ave) | 7.1 | 7.5 | 7.5 | 7.45 | 7.4 |
| RB Yellow | 70 | 70 | 70 | 70 | 70 |
| RBD Red | 0.6 | 0.5 | 0.6 | 0.5 | 0.6 |
| RBD Red | 0.4 | 0.4 | 0.5 | 0.4 | 0.6 |
| RBD Red (Ave) | 0.5 | 0.45 | 0.66 | 0.45 | 0.6 |
| RBD Yellow | 3.7 | 3.7 | 3.3 | 3.6 | 3.2 |
| RBD Yellow | 3.1 | 3.3 | 3.5 | 3.7 | 3.3 |
| RBD Yellow (Ave) | 3.4 | 3.5 | 3.4 | 3.65 | 3.25 |
| RBD Color Index | 0.42 | 0.40 | 0.445 | 0.408 | 0.463 |
| FM[3], wt-% | 9.5 | 9.0 | 9.0 | 9.8 | 7.5 |
| pH (5% slurry) | 6.60. | 3.63 | 3.41 | 3.43 | 3.42 |
| EC[4] $\mu$S/cm | 47.0 | 1260.0 | 1602.0 | 1588.0 | 1608.0 |

Bleach: 200 grams RSBO (R-97-73A1), 194° F., 15 minutes, 26 inches Hg, 0.7% Clay
Deodorization: 60 grams bleached oil for 1 hour
[1]LECO SC 432 sulfur analyzer
[2]chlorophyll, ppb
[3]free moisture content of clay mineral
[4]at 25° C.

sulfuric acid so as to maintain a substantially constant ratio of surface acidity to added acidity for the clay mineral while the sulfuric acid is combined with the clay mineral; the sulfuric acid added being in an amount sufficient to provide in the bleaching clay product no more than 1.5 milliequivalents of added acidity per gram of the bleaching clay product, and the clay mineral having an electrical conductivity in an aqueous slurry of at least 50 microSiemens per centimeter at 25 degrees Celsius.

2. The method in accordance with claim 1 wherein said electrical conductivity is at least 70 microSiemens per centimeter.

3. The method in accordance with claim 1 wherein said electrical conductivity is in the range of about 50 to about 350 microSiemens per centimeter.

4. A method for monitoring acidification of non-acidic clay mineral comprising palygorskite and smectite which comprises the step of measuring the electrical conductivity of an aqueous slurry of said clay mineral to which an acid has been added.

5. The method of claim 4 wherein said acid is sulfuric acid.

* * * * *